United States Patent
O et al.

(10) Patent No.: US 7,393,891 B2
(45) Date of Patent: Jul. 1, 2008

(54) GRAFT COPOLYMER LATEX AND METHOD FOR PREPARING DRIED POWDER THEREOF

(75) Inventors: Hyun-taek O, Jeollanam-do (KR);
Tae-bin Ahn, Uijeongbu-si (KR);
Jung-tae Park, Daejeon-si (KR);
Keon-hoon Yoo, Yeosu-si (KR)

(73) Assignee: LG Chem, Ltd., Seoul (KR)

( * ) Notice: Subject to any disclaimer, the term of this patent is extended or adjusted under 35 U.S.C. 154(b) by 427 days.

(21) Appl. No.: 10/517,070

(22) PCT Filed: Jun. 9, 2004

(86) PCT No.: PCT/KR2004/001369

§ 371 (c)(1),
(2), (4) Date: Dec. 3, 2004

(87) PCT Pub. No.: WO2005/012395

PCT Pub. Date: Feb. 10, 2005

(65) Prior Publication Data

US 2005/0159529 A1    Jul. 21, 2005

(30) Foreign Application Priority Data

Aug. 5, 2003    (KR) ............. 10-2003-0054189

(51) Int. Cl.
*C08J 3/12*    (2006.01)
*C08K 5/00*    (2006.01)

(52) U.S. Cl. .............. 524/458; 524/904; 523/201; 526/201

(58) Field of Classification Search ............. 524/458, 524/904; 523/201; 526/201
See application file for complete search history.

(56) References Cited

U.S. PATENT DOCUMENTS

| | | | |
|---|---|---|---|
| 4,419,496 A | | 12/1983 | Henton et al. |
| 5,206,299 A | * | 4/1993 | Oshima et al. ............. 525/305 |
| 5,362,804 A | * | 11/1994 | Oshima et al. ............. 525/64 |
| 5,399,621 A | | 3/1995 | Kohlhammer |
| 5,455,315 A | * | 10/1995 | Paine et al. ............. 526/79 |
| 5,773,520 A | * | 6/1998 | Bertelo et al. ............. 525/309 |

FOREIGN PATENT DOCUMENTS

| | | |
|---|---|---|
| EP | 913408 A2 | 5/1999 |
| EP | 1201692 A1 | 5/2002 |
| JP | 11-140140 A | 5/1999 |

* cited by examiner

*Primary Examiner*—Kelechi C Egwim
(74) *Attorney, Agent, or Firm*—Birch, Stewart, Kolasch & Birch, LLP

(57) ABSTRACT

The present invention is related to a method of manufacture of a graft copolymer latex and its dried powder including a step of manufacture of a latex using a reactive surfactant for a surfactant in manufacturing of the graft copolymer latex containing acrylic polymers and a step of manufacture of dried powder in which the graft copolymer latex manufactured in the above step of manufacture of a latex is sprayed and dried. The method according to the present invention is effective in that it is possible to provide for dried powder of a graft copolymer latex having a low moisture content and a high powder density and to provide for a thermoplastic resin composition containing the above latex having superior luster, tensile strength, and thermal stability.

13 Claims, No Drawings

GRAFT COPOLYMER LATEX AND METHOD FOR PREPARING DRIED POWDER THEREOF

TECHNICAL FIELD

The present invention is related to a method of manufacture of a graft copolymer latex and its dried powder. In more detail, it is related to a method of manufacture of a copolymer latex having a superior stability and the solid weight fraction of 50 weight % and more; a method of manufacture of the dried powder of a graft copolymer latex having a low moisture content but a high powder density by spraying and drying the copolymer latex; and a thermoplastic resin composition containing the above and having a superior thermal stability.

BACKGROUND ART

Acrylonitrile-butadiene-styrene (ABS), methyl methacrylate-butadiene-styrene (MBS), acrylate-styrene-acrylonitrile (ASA), acrylic impact modifier (AIM), etc. that are manufactured through emulsion polymerization have superior impact tolerance, strength, fluidity, etc., and are used extensively for reforming agents of various kinds of plastic materials. Although such graft copolymers are manufactured through emulsion polymerization, it is necessary to recover polymers in the dried powder form for melting and mixing with other resins.

Usually, one of the methods of recovery of dried powder of polymers from the latex obtained through emulsion polymerization is a method of recovery through dehydration and drying by adding an aggregation agent to the above latex and aggregating the graft polymers in the latex. However, this method of recovery of the polymer powder from the latex by adding an aggregation agent has been problematic in that it has been necessary to have the aggregation process, washing or dehydration process of the aggregation agent, and drying process until the polymers have been recovered in the dried powder form since polymer particles have been coagulated in water usually; facility expenses have been high; and it has not been easy to manage operation of the above processes.

Also, an excessive amount of waste water has been generated during the aggregation process as well as washing and dehydration processes, and it has required for an excessive amount of energy since the aggregation process has been performed at a high temperature. Further, there have been problems such as formation of chromophoric groups, generation of matrix adhesive materials, lowering of luster, etc. since the aggregation agent has remained in the polymer powder recovered from the latex by administering an aggregation agent such as inorganic salts such as aluminum chloride, sodium sulfate, sodium nitrate, calcium chloride, etc. or sulfuric acid, etc.

Another method of recovery of polymers in the dried powder form from the polymer latex is a process of spraying and drying the polymer latex directly with hot air. This process enables obtaining of dried powder from a polymer latex manufactured through emulsion polymerization at a time. It is a preferred process industrially in view of the simplicity of the process, installation expenses, and management of its operation.

The method of recovery of powder from the polymer latex through spraying and drying is disclosed in European Patent No. 1,201,692. Disclosed in this patent is a method of manufacture of a powdered composition of a high rubber impact controlling agent in which the weight fraction of the rubber phase is 90 weight % or greater through spraying and drying of a latex containing two kinds of core-shell polymer particles of which average particle diameter differs by 50% or greater. It has been reported that the high rubber impact controlling agent powder manufactured through spraying and drying as described in the above has been advantageous in that it has required for a less amount of a flowing builder in offering compaction-free powder.

Also, disclosed in Japanese Patent No. 2002-363292 is a method of recovery of polymer powder through spraying and drying of a polymer latex by controlling the temperature of the outlet portion of a spraying drier, separating and recovering polymer powder, aggregating moisture by supplying a part of exhaust gas to the aggregation device, heating and re-circulating, and controlling the concentration of oxygen in the spraying drier to be 5 volume % or less.

Further, disclosed in Japanese Patent No. 2002-226595 is a method of manufacture of diene graft polymer powder through spraying and drying of a diene graft polymer latex economically without worrying about ignition of the diene graft polymer by automatic oxidation, etc. in the drier by spraying the diene graft polymer latex into the drier and sending overheated water vapor to the inlet portion of the drier at the same time.

Still further, disclosed in Japanese Patent No. 2001-213969 is a method of reducing the amount of generation of fisheye while improving re-dispersibility during melting and mixing in the method of recovery of powder by spraying and drying of an emulsion polymerization latex of which main component is an acrylic polymer by lowering aggregation of the surface of acrylic resin composition powder by using overheated water vapor for heating gas for drying.

The conventional process of recovery of polymer powder by administering an aggregation agent is composed of the processes of aggregation, washing and dehydration, and drying. And therefore, it is possible to obtain powder from which most of impurities such as surfactants, electrolytes, etc. is removed. However, inasmuch as spraying and drying is a process of manufacture of dried powder of polymers by removing aqueous dispersion materials from the polymer latex manufactured through emulsion polymerization by using a heated gas, the powder manufactured through spraying and drying naturally contains an excessive amount of impurities such as surfactants, electrolytes, etc. added in view of characteristics of emulsion polymerization.

Accordingly, the dried powder manufactured through spraying and drying has had a problem of inferior thermal stability due to surfactants, electrolytes, etc. remaining in the dried powder. Particularly, it has been problematic that the surfactant remaining in the polymer powder has lowered the thermal stability during melting and mixing it with other resins.

When melting and mixing the polymer latex polymerized by using a non-reactive surfactant with other resins by using the polymer dried powder manufactured through spraying and drying, there occurs a phenomenon of lowering of the quality of appearance such as shining of the final product, etc. as the movement of the surfactant remaining in the dried powder becomes free. Also, the surfactant that can move freely as it remains in the dried powder has had a problem of lowering of strength of the final product as it has assumed the role of a plasticizer.

The above-described patent still had a problem of failing to present a method of solution for lowering of thermal stability due to the surfactant remaining in the polymer dried powder manufactured through spraying and drying.

In the meantime, the inventors of the present invention have found that it has been possible for a small amount of a surfactant to secure the stability of the latex through chemical bonding, not physical absorption, if it has been a reactive surfactant, and it has been possible to prevent lowering of thermal stability due to a surfactant during melting and mixing of the dried powder manufactured by using a reactive surfactant with other resins.

DISCLOSURE OF INVENTION

In order to solve the problems as described in the above, it is therefore an object of the present invention to offer a graft copolymer latex having a superior stability and the solid weight fraction of 50 weight % to 70 weight % by using a reactive surfactant for a surfactant that is added during emulsion polymerization as well as dried powder by spraying and drying the above graft copolymer latex. Another object of the present invention is to offer a thermally plastic resin composition containing the above-described dried powder and having a superior thermal stability.

All of the above-described and other objects of the present invention may be achieved by the present invention illustrated below:

In order to achieve the above-described objects, the present invention provides for a graft copolymer latex comprising a seed polymer further comprising 1 to 15 parts by weight of one or more monomers selected from the group of vinylaromatic compounds, vinylcyan compounds, and compounds containing the units derived from methyl methacrylate, 0.01 to 0.5 parts by weight of a cross-linking agent, and 0.01 to 0.5 parts by weight of a grafting agent; a core polymer comprising 20 to 70 parts by weight of alkyl acrylate monomer, 0.1 to 1 part by weight of a cross-linking agent, 0.05 to 0.5 parts by weight of a grafting agent, and 0.05 to 2 parts by weight of a surfactant; and a graft shell monomer comprising 20 to 60 parts by weight of a vinylaromatic compound, 10 to 30 parts by weight of a vinylcyan compound, and 0.05 to 2 parts by weight of a reactive surfactant.

In the manufacture of a graft copolymer latex containing acrylic polymers comprising a step of manufacture of seed polymers, a step of manufacture of core polymers, and a step of manufacture of graft shell polymers, the present invention also provides for a method of manufacture of the dried powder of a graft copolymer latex comprising a step of manufacture of a graft copolymer latex using a reactive surfactant for the surfactant when manufacturing the above graft shells; and a step of manufacture of dried powder by spraying and drying the graft copolymer latex manufactured in the above step of manufacture of the latex.

The above step of manufacture of the graft copolymer latex is comprised of a step of manufacture of seeds in which 1 to 15 parts by weight of one or more monomers selected from the group of vinylaromatic compounds, vinylcyan compounds, and compounds containing the units derived from methyl methacrylate, 0.01 to 0.5 parts by weight of a cross-linking agent, and 0.01 to 0.5 parts by weight of a grafting agent are polymerized; a step of manufacture of the core in which 20 to 70 parts by weight of an alkyl acrylate monomer, 0.1 to 1 part by weight of a cross-linking agent, 0.05 to 0.5 parts by weight of a grafting agent, and 0.05 to 2 parts by weight of a surfactant are polymerized; and a step of manufacture of the graft shell in which 20 to 60 parts by weight of a vinylaromatic compound, 10 to 30 parts by weight of a vinylcyan compound, and 0.05 to 2 parts by weight of a reactive surfactant are polymerized.

The above-described aromatic vinyl compound may be one or more kinds of compounds selected from the group of styrene, α-methylstyrene, para-methylstyrene, and vinyltoluene.

The above-described vinyl cyan compound may be acrylonitrile or methacrylonitrile.

The above-described alkyl acrylate may be butyl acrylate or ethylhexyl acrylate.

The above-described reactive surfactant may be one or more kinds of surfactants selected from a group comprising an ionic or non-ionic reactive surfactant containing an aryl group, an ionic or non-ionic reactive surfactant containing a (meth)acroyl group, an ionic or non-ionic reactive surfactant containing a propenyl group, and their mixture.

The solid weight fraction of the graft copolymer latex manufacture in the above step of manufacture of the graft copolymer latex may be 50 to 70 weight %.

The total solid weight fraction of the graft copolymer latex in the above step of manufacture of dried powder may be 50 to 70 weight %.

In the above step of manufacture of the graft copolymer latex, a reactive surfactant and a non-reactive surfactant may be mixed and used.

The inlet temperature of the gas for drying may be 150 to 250° C. during spraying and drying in the above.

The above-described cross-linking agent may be selected from the group of ethyleneglycol dimethacrylate, diethyleneglycol dimethacrylate, triethyleneglycol dimethacrylate, 1,3-butandiol dimethacrylate, 1,6-hexanediol dimethacrylate, neopentylglycol dimethacrylate, trimethyolpropane trimethacrylate, and trimethylolmethane triacrylate.

The above-described grafting agent may be selected from the group of allyl methacrylate, triallylisocyanurate, triallylamine, and diallylamine.

Further, the present invention provides for dried powder of the graft copolymer latex manufactured according to the above method of manufacture.

Still further, the present invention provides for a thermoplastic resin composition containing dried powder of the graft copolymer latex manufactured according to the above method of manufacture.

The present invention is illustrated in more detail below:

The seed component used for the present invention is composed of hard polymer-forming monomers of which glass transition temperature is at least 60° C. or higher. It is preferable to mix and use one or more kinds of monomers of a vinylaromatic compound, a vinylcyan compound, and a compound containing the units derived from methyl methacrylate.

The core component is a cross-linked alkyl acrylate polymer of a proper form having the glass transition temperature of lower than 0° C. Preferably, the cross-linked alkyl acrylate polymer should have the glass transition temperature of lower than −20° C., particularly, lower than −30° C. The glass transition temperature of the alkyl acrylate polymer may be measured according to the DSC method, for example.

The above-described alkyl acrylate monomer used for the present invention is an alkyl acrylate having 2 to 8 carbon atoms, preferably 4 to 8 carbon atoms, in the alkyl portion. Particularly proper monomers are butyl acrylate and ethylhexyl acrylate.

It is preferable to use a styrene monomer derivative for the vinylaromatic compound used for the present invention. For example, styrene, α-methylstyrene, para-methylstyrene, vinyltoluene, etc. may be used. It is also preferable to use acrylonitrile, methacrylonitrile, etc. for the vinylcyan compound used for the present invention.

The hard matrix that may be melted and mixed with the dried powder manufactured in the present invention is composed of hard polymer-forming monomers of which glass transition temperature is at least 60° C. or higher. It is preferable to mix and use one or more kinds of monomers of a vinylaromatic compound, a vinylcyan compound, a compound containing the units derived from methyl methacrylate, a compound that may form the polycarbonate polymer, etc.

The reactive surfactant used for the present invention is a surfactant having a double bond that can react with the monomer during polymerization. More concretely, it may be an ionic or non-ionic reactive surfactant containing an ally group, an ionic or non-ionic reactive surfactant containing a (meth)acroyl group, an ionic or non-ionic reactive surfactant containing a prophenyl group, etc. And it is possible to use one kind of a reactive surfactant or to mix and use two or more kinds of reactive surfactants.

It is preferable to use 0.05 to 2 parts by weight of a reactive surfactant used for the present invention. If 2 parts by weight or more of a reactive surfactant are used, there occurs a problem of lowering of thermal stability and impact strength. Particularly when manufacturing the graft shell, if 2 parts by weight or more of a reactive surfactant are used, free polymers that are not grafted are produced excessively and there occurs a problem of lowering of impact strength and luster.

The method of manufacture of the graft copolymer latex of the present invention is illustrated in more detail below:

Firstly, in the manufacture of cross-linked hard polymers that are the seeds, 0.01 to 0.5 parts by weight of a cross-linking agent and 0.01 to 0.5 parts by weight of a grafting agent are added to 1 to 15 parts by weight of a vinylaromatic compound, and polymerized based on 100 parts by weight of the total monomers used for the manufacture of the graft copolymer latex.

In the reaction to manufacture the above cross-linked hard polymer seeds, it is possible to perform emulsion polymerization singly or to properly mix non-emulsion polymerization and emulsion polymerization. And in the method of inputting monomers, it is possible either to use singly collective input or continuous input or to use both of them simultaneously.

As to the monomers used for the manufacture of the above-described cross-linked hard polymer seeds, it is possible to use singly a compound containing the units derived from a vinylaromatic compound, a vinylcyan compound, and methyl methacrylate, or to mix and use two or more kinds of monomers.

Secondly, in the manufacture of cross-linked alkyl acrylate rubber polymers that are the core, 0.1 to 1 part by weight of a cross-linking agent and 0.05 to 0.5 parts by weight of a grafting agent are added to 20 to 70 parts by weight of an alkyl acrylate monomer under the existence of the above-described cross-linked hard polymer seeds and polymerized based on 100 parts by weight of the total monomers used for the manufacture of the graft copolymer latex.

The cross-linking agent used for the manufacture of the above-described seeds or core may be ethyleneglycol dimethacrylate, diethyleneglycol dimethacryulate, triethyleneglycol dimethacryalte, 1,3-butanediol dimethacrylate, 1,6-hexanediol dimethacrylate, neopentylglycol dimethacrylate, trimethylolpropane trimethacryalte, trimethylolmethane triacrylate, etc.; and the above-described grafting agent may be allyl methacrylate, triallylisocyanurate, triallylamine, diallylamine, etc.

In the reaction to manufacture the above cross-linked alkyl acrylate rubber, it is possible to perform emulsion polymerization singly or to properly mix non-emulsion polymerization and emulsion polymerization. And in the method of inputting monomers, it is possible either to use singly collective input or continuous input or to use both of them simultaneously.

Thirdly, in the manufacture of non-cross-linked polymers of an aromatic vinyl compound and a vinyl cyan compound that are the graft shell, 20 to 60 parts by weight of a vinylaromatic compound and 10 to 30 parts by weight of a vinylcyan compound are added to each other and polymerized based on 100 parts by weight of the total monomers used for the manufacture of the graft copolymer latex under the existence of the above-described alkyl acrylate rubber polymers (core).

It is preferable to employ emulsion polymerization for the above reaction to manufacture the graft shell, and to use the continuous input method for inputting mixed monomers containing an emulsion agent when reacting the graft.

It is possible to use a controlling agent of molecular weight in order to control the molecular weight of the graft polymers of the present invention. Preferably, tert-dodecyl mercaptane may be used.

It was found that it was advantageous economically to have the concentration of polymers of 45 weight % or greater in the process of spraying and drying in spite of that it was not required for the final graft copolymer latex containing the above-described seeds, core, and graft shell to have a specific solid weight fraction. Accordingly, in the present invention, the solid weight fraction of the above-described graft copolymer latex was 45 weight % or greater to 75 weight % or lower, preferably 50 weight % or greater to 70 weight % or lower.

Fourthly, it is possible to recover dried graft copolymer powder by spraying the graft copolymer latex manufactured in the present invention into the drier and injecting the gas for drying from the upper or lower portion of the drier. It is preferable to use heated air or nitrogen for the dry gas, or overheated water vapor. A method of spraying using a pressurized spraying nozzle or a rotating disk is applicable to the method of pulverizing the latex through spraying.

It is also possible to add a proper anti-oxidant, additive, etc. to the graft copolymer latex in order to prevent oxidation of graft copolymer powder in the drier and to spray and dry. It is further possible to add mineral(s) such as silica, talc, calcium carbonate, etc. in the powder form and spray and dry in order to improve the performance of powdered bodies such as the volume, specific gravity, etc. of dried powder.

Preferably, the inlet temperature of the gas for drying should be lower than 250° C. during spraying and drying. Although there is no special limit to the inlet temperature of the gas for drying, preferably, the temperature should be 150 to 250° C. Particularly, the higher the solid weight fraction of the graft copolymer latex is, the easier it is to lower the inlet temperature of the gas for drying. If the solid weight fraction of the graft copolymer latex is 55% or greater, it is possible to operate the drier by having the inlet temperature of the gas for drying be 170° C.

BEST MODE FOR CARRYING OUT THE INVENTION

The foregoing and other objects, aspects, and advantages will be better understood from the following detailed description of preferred embodiments of the invention:

PREFERRED EMBODIMENTS 1

Firstly, in the manufacture of the seed, 8 parts by weight of styrene, 0.01 part by weight of sodium dodecyl sulfate, 0.04 parts by weight of ethyleneglycol dimethacrylate, 0.02 parts by weight of allyl methacrylate, and 32 parts by weight of distilled water were put into a reaction device collectively, heated to 70° C., and reacted after adding 0.05 parts by weight of potassium persulfate. They were reacted to manufacture the seed while maintaining 70° C. for 1 hour thereafter.

Secondly, in the manufacture of the core, a mixture of 50 parts by weight of butyl acrylate, 0.3 parts by weight of sodium dodecyl sulfate, 0.2 parts by weight of ethyleneglycol dimethacrylate, 0.1 part by weight of allyl methacrylate, 20 parts by weight of distilled water, and 0.05 parts by weight of potassium persulfate was inputted continuously at 70° C. for 4 hours under the existence of the above-described seed latex, and polymerization was continued for 1 more hour after inputting was terminated.

Thirdly, in the manufacture of the graft shell, a mixture of 30.24 parts by weight of styrene, 11.76 parts by weight of acrylonitrile, 0.6 parts by weight of Hitenol BC-10 (product of Daiichi Kogyo Seiyaku Company), 0.1 part by weight of potassium persulfate, 0.1 part by weight of tert-dodecyl mercaptan, and 30 parts by weight of distilled water was inputted continuously at 70° C. for 4 hours under the existence of the above-described acrylate rubber polymer to perform the polymerization reaction. Also, in order to increase the rate of conversion of polymerization, the temperature was increased to 75° C. after inputting was terminated, the reaction was continued for 1 more hour, and the temperature was lowered to 60° C. The total solid weight fraction in the final graft copolymer latex obtained after the reaction was terminated was shown to be 55%.

The stability of the above-described graft copolymer latex polymerized was measured in terms of the coagulated material obtained through recovery and drying of the coagulated material produced in the reactor after polymerization according to the following mathematical equation:

Coagulated material=(Weight of coagulated material produced in the reactor)/(Weight of the total monomers inputted)×100

After inputting an anti-oxidant and a stabilizer to the graft copolymer latex obtained in the above, the mixture was sprayed and dried by using a spraying drier to which a spraying wheel is attached under the following conditions: The speed of rotation per minute of the spraying wheel was 10,000 rpm, the speed of supply of the latex was 50 g/min, the temperature of the dried air was 170° C., and the temperature of the powder was 60° C.

The moisture content of the above-described sprayed and dried powder was 0.05%, and the powder density was 0.55 g/cm$^3$.

To 40 parts by weight of the graft copolymer latex obtained in the above and 60 parts by weight of the styrene-acrylonitrile copolymer (product of LG Chemical Company, product name: 92HR) for the hard matrix, 1 part by weight of a lubricant, 0.5 parts by weight of an anti-oxidant, and 0.5 parts by weight of a UV stabilizer were added and mixed. The mixture was formulated in the pellet form by using a 40-φ extrusion mixer at the cylinder temperature of 220° C., and samples for measuring physical properties were made by injection of these pellets. Physical properties were measured as follows by using them, and were shown in the following Table 1 along with the coagulated material produced, moisture content, and density of powder:

a) Izod impact strength (¼" notched at 23° C., kg·cm/cm)—Measured according to ASTM D256.
b) Tensile strength (50 mm/min, kg/cm$^2$)—Measured according to ASTM D638.
c) Luster (45° angle)—Measured according to ASTM D528.
d) Thermal stability—After having the pellets made by using an extrusion mixer stayed in the injection molder having the molding temperature of 250° C. for 15 minutes, the degree of change in color of the samples molded was shown in terms of the following equation in Table 1:

$$\Delta E = \sqrt{\{(L-L')^2 + (a-a')^2 + (b-b')^2\}}$$

where ΔE was an arithmetic average of Hunter Lab values before and after staying. It shows that the closer the value is to 0, the better the thermal stability is.

PREFERRED EMBODIMENT 2

The methods of manufacture of the product of interest were performed in the same methods as in Preferred Embodiment 1 except that 0.3 parts by weight and 0.6 parts by weight of UFO MM (product of Toagosei Company) were used instead of 0.3 parts by weight of sodium dodecyl sulfate and 0.6 parts by weight of Hitenol BC-10 (product of Daiichi Kogyo Seiyaku) as the surfactant in manufacturing of the core and the graft shell in the above Preferred Embodiment 1.

PREFERRED EMBODIMENT 3

The methods of manufacture of the product of interest were performed in the same methods as in Preferred Embodiment 1 except that 0.3 parts by weight of sodium dodecyl allyl sulfosuccinate (product of Henkel Company, Trade Name: TREM LF-40) were used instead of 0.3 parts by weight of sodium dodecyl sulfate and 0.6 parts by weight of Hitenol BC-10 (product of Daiichi Kogyo Seiyaku Company) as the surfactant in manufacturing of the core and 0.3 parts by weight of sodium dodecyl allyl sulfosuccinate (product of Henkel Company, Trade Name: TREMJ LF-40) and 0.3 parts by weight of potassium salt of rosin acid were used in manufacturing of the graft shell in the above Preferred Embodiment 1.

PREFERRED EMBODIMENT 4

The methods of manufacture of the product of interest were performed in the same methods as in Preferred Embodiment 1 except that calcium carbonate particles coated with stearate were added in spraying and drying in the above Preferred Embodiment 1.

PREFERRED EMBODIMENT 5

The methods of manufacture of the product of interest were performed in the same methods as in Preferred Embodiment 1 except that 8 parts by weight of methyl methacrylate were used instead of 8 parts by weight of styrene in manufacturing of the seed in the above Preferred Embodiment 1.

PREFERRED EMBODIMENT 6

The methods of manufacture of the product of interest were performed in the same methods as in Preferred Embodiment 1 except that 7 parts by weight of methyl methacrylate and 1 part by weight of acrylonitrile were used instead of 8 parts by weight of styrene in manufacturing of the seed in the above Preferred Embodiment 1.

COMPARATIVE EXAMPLE 1

The methods of manufacture of the product of interest were performed in the same methods as in Preferred Embodiment 1 except that 0.3 parts by weight of sodium dioctyl sulfosuccinate were used in manufacturing of the core and 0.6 parts by weight of potassium oleate were used in manufacturing of the graft shell instead of 0.3 parts by weight of sodium dodecyl sulfate and 0.6 parts by weight of Hitenol BC-10 (product of Daiichi Kogyo Seiyaku Company) as the surfactant in manufacturing of the core and graft shell in the above Preferred Embodiment 1.

COMPARATIVE EXAMPLE 2

The methods of manufacture of the product of interest were performed in the same methods as in Preferred Embodiment 1 except that the graft polymer latex having the total solid weight fraction of 40 weight % was made by using 45 parts by weight of distilled water in manufacturing of the core and 70 parts by weight of distilled water in manufacturing of the graft shell instead of 20 parts by weight and 30 parts by weight of distilled water in manufacturing of the core and graft shell in the above Preferred Embodiment 1.

COMPARATIVE EXAMPLE 3

The methods of manufacture of the product of interest were performed in the same methods as in Preferred Embodiment 1 except that 0.6 parts by weight of sodium dioctyl sulfosuccinate in manufacturing of the core and 1.5 parts by weight of potassium oleate in manufacturing of the graft shell were used instead of 0.3 parts by weight of sodium dodecyl sulfate and 0.6 parts by weight of Hitenol BC-10 (product of Daiichi Kogyo Seiyaku Company) as the surfactant in manufacturing of the core and graft shell in the above Preferred Embodiment 1.

COMPARATIVE EXAMPLE 4

The methods of manufacture of the product of interest were performed in the same methods as in Comparative Example 3 except that the temperature of drying air was controlled to be 200° C. and that of powder to be 60° C. in spraying and drying in the above Comparative Example 3.

COMPARATIVE EXAMPLE 5

The methods of manufacture of the product of interest were performed in the same methods as in Preferred Embodiment 1 except that 2.5 parts by weight of Hitenol BC-10 (product of Daiichi Kogyo Seiyaku Company) in manufacturing of the core and 2.5 parts by weight in manufacturing of the graft shell were used instead of 0.3 parts by weight of sodium dodecyl sulfate and 0.6 parts by weight of Hitenol BC-10 as the surfactant in manufacturing of the core and graft shell in the above Preferred Embodiment 1.

COMPARATIVE EXAMPLE 6

Dried power was obtained by administering an anti-oxidant and a stabilizer to the graft polymer latex manufactured in the same method as in the above Preferred Embodiment 1, aggregating the mixture at 80° C. with the aqueous calcium chloride solution, and going through dehydration and drying processes. Samples of the powder obtained were made to measure its physical properties by going through the extrusion and mixing and injection processes in the same method as in the above Preferred Embodiment 1.

TABLE 1

| | Example | | | | | |
|---|---|---|---|---|---|---|
| | 1 | 2 | 3 | 4 | 5 | 6 |
| Coagulated material | 0.14 | 0.13 | 0.16 | 0.14 | 0.14 | 0.16 |
| Moisture content | 0.05 | 0.06 | 0.05 | 0.04 | 0.05 | 0.06 |
| Powder density | 0.55 | 0.55 | 0.56 | 0.58 | 0.55 | 0.54 |
| Impact strength | 28 | 28 | 25 | 25 | 28 | 27 |
| Tensil strength | 550 | 540 | 570 | 580 | 560 | 570 |
| Luster | 95 | 94 | 96 | 93 | 96 | 96 |
| Thermal color change | 2.8 | 2.6 | 2.6 | 2.6 | 2.7 | 2.7 |

| | Comparative Example | | | | | |
|---|---|---|---|---|---|---|
| | 1 | 2 | 3 | 4 | 5 | 6 |
| Coagulated material | 5.8 | 0.09 | 2.5 | 2.5 | 0.14 | 0.14 |
| Moisture content | 0.06 | 0.23 | 0.10 | 0.05 | 0.1 | 0.07 |
| Powder density | 0.55 | 0.51 | 0.51 | 0.52 | 0.52 | 0.35 |
| Impact strength | 20 | 25 | 22 | 23 | 15 | 27 |
| Tensil strength | 490 | 510 | 490 | 490 | 510 | 550 |
| Luster | 85 | 91 | 89 | 88 | 54 | 93 |
| Thermal color change | 6.3 | 3.5 | 7.1 | 6.8 | 6.3 | 2.7 |

The graft copolymer latexes manufactured by using a reactive surfactant of which weight fraction is 55% in the preferred embodiments in the above Table 1 have a superior stability, the dried powder manufactured by spraying and drying the above latexes has a high density but a low moisture content, and the thermoplastic resin containing the above dried powder is advantageous in that it has superior tensile strength, luster, and thermal stability.

Particularly, in Comparative Examples 1, 3, and 4 where graft copolymer latexes were manufactured by using non-reactive surfactants, the stability, tensile strength, luster, and thermal stability of the latexes were weak. In Comparative Example 2 where the solid weight fraction of the graft copolymer latex thus manufactured was 40%, the moisture content was high, and therefore, the productivity by drying was lowered. In Comparative Example 5 where each of 2.5 parts by weight of a reactive surfactant was used in manufacturing of the core and graft shell, the moisture content was high, and the tensile strength and luster were weak. Finally, in Comparative Example 6 where dried powder was manufactured by aggregating the graft copolymer latex manufactured with the aqueous calcium chloride solution and going through dehydration and drying processes, there was a disadvantage that the density of powder was low.

INDUSTRIAL APPLICABILITY

As illustrated in the above, the method of manufacture of dried power of the graft copolymer latex of the present invention is the method of manufacture of dried powder of the graft copolymer latex manufactured by using reaction-type surfactant(s) through spraying and drying. Thus manufactured dried powder of the graft copolymer latex is effective in that its moisture content is low but density is high. Also, the thermoplastic resin composition containing dried powder of the above graft copolymer latex of the present invention is a useful invention in that it has superior impact tolerance, tensile strength, luster, and particularly, superior effect in its thermal stability.

While several preferred embodiments and comparative examples of the invention have been shown and described, it is to be distinctly understood that the invention is not limited thereto but may be otherwise variously embodied and practiced within the scope of the claims of the present invention.

What is claimed is:

1. A method of manufacture of dried powder of a graft copolymer latex comprising the steps of:
    manufacturing the graft copolymer latex, which comprises the steps of:
    manufacturing a seed polymer by polymerizing 1 to 15 parts by weight of one or more monomers selected from said group of vinylaromatic compounds, vinylcyan compounds, and compounds containing the units derived from methyl methacrylate, 0.01 to 0.5 parts by weight of a cross-linking agent, and 0.01 to 0.5 parts by weight of a grafting agent, based on 100 parts by weight of the total monomer used for the manufacture of the graft copolymer latex;
    manufacturing a core polymer by polymerizing 20 to 70 parts by weight of an alkyl acrylate monomer, 0.1 to 1 part by weight of a cross-linking agent, 0.05 to 0.5 parts by weight of a grafting agent, and 0.05 to 2 parts by weight of a surfactant in the presence of the seed polymer, based on 100 parts by weight of the total monomers used for the manufacture of the graft copolymer latex; and
    manufacturing a graft shell polymer by polymerizing 20 to 60 parts by weight of a vinylaromatic compound, 10 to 30 parts by weight of a vinylcyan compound, and 0.05 to 2 parts by weight of a reactive surfactant having double bonds capable of reacting with a monomer during the polymerization, in the presence of the core polymer, based on 100 parts by weight of the total monomers used for the manufacture of the graft copolymer latex; and
    manufacturing the dried powder, wherein said graft copolymer latex manufactured in said steps of manufacturing of the graft copolymer latex is sprayed and dried.

2. The method of manufacture of dried powder of the graft copolymer latex according to claim 1, wherein said vinylaromatic compound is one or more kinds of compounds selected from the group of styrene, α-methylstyrene, para-methylstyrene, and vinyltoluene.

3. The method of manufacture of dried powder of the graft copolymer latex according to claim 1, wherein said vinylcyan compound is acrylonitrile or methacrylonitrile.

4. The method of manufacture of dried powder of the graft copolymer latex according to claim 1, wherein said alkyl acrylate is buthyl acrylate or ethylhexyl acrylate.

5. The method of manufacture of dried powder of the graft copolymer latex according to claim 1, wherein said reactive surfactant is one or more kinds of surfactants selected from the group of ionic and non-ionic reactive surfactants containing an allyl group, ionic and non-ionic reactive surfactants containing a (meth)acroyl group, ionic and non-ionic reactive surfactants containing a prophenyl group, and their mixture.

6. The method of manufacture of dried powder of the graft copolymer latex according to claim 1, wherein said cross-linking agent is one or more kinds of agents selected front the group of ethyleneglycol dimethacrylate, diethyleneglycol dimethacrylate, triethyleneglycol dimethacrylate, 1,3-butanediol dimethacrylate, 1,6-hexanediol dimethacrylate neopentylglycol dimethacrylate, trimethylolpropane trimethacrylate, and trimethylolmethane triacrylate.

7. The method of manufacture of dried powder of the graft copolymer latex according to claim 1, wherein said grafting agent is one or more kinds of agents selected from the group of allyl methacrylate, triallylcyanurate, triallylamine, and diallylamine.

8. The method of manufacture of dried powder of the graft copolymer latex according to claim 1, wherein the solid weight fraction of said graft copolymer latex manufactured in said step of manufacturing of the graft copolymer latex is 50 weight % to 70 weight %.

9. The method of manufacture of dried powder or the graft copolymer latex according to claim 1, wherein the total solid weight fraction of said graft copolymer latex in said step of manufacturing of dried powder is 50 % to 70 weight %.

10. The method of manufacture of dried powder of the graft copolymer latex according to claim 1, wherein a reactive surfactant and non-reactive surfactant are mixed and used in said step of manufacture of the graft copolymer latex.

11. The method of manufacture of dried powder of the graft copolymer latex according to claim 1, wherein the inlet temperature of dying gas during spraying and drying is 150 to 250° C.

12. Dried powder of said graft copolymer latex manufactured according to any of claims 1 and 2 to 11.

13. A thermoplastic resin composition including dried powder of said graft copolymer latex manufactured according to any of claims 1 and 2 to 11.

* * * * *